(12) United States Patent
Takayama et al.

(10) Patent No.: US 6,603,917 B2
(45) Date of Patent: Aug. 5, 2003

(54) PLANAR OPTICAL WAVEGUIDE WITH CORE BARRIER

(75) Inventors: Kazuya Takayama, Phoenixville, PA (US); Donald S. Bitting, Reading, PA (US); Robert A. Norwood, West Chester, PA (US)

(73) Assignee: Photon-X, Inc, Malvern, PA (US)

( * ) Notice: Subject to any disclaimer, the term of this patent is extended or adjusted under 35 U.S.C. 154(b) by 0 days.

(21) Appl. No.: 10/040,556

(22) Filed: Nov. 7, 2001

(65) Prior Publication Data

US 2003/0086672 A1 May 8, 2003

(51) Int. Cl.⁷ .................................................. G02B 6/10
(52) U.S. Cl. ........................ 385/129; 385/130; 385/131; 385/132
(58) Field of Search ................................ 385/129, 130, 385/131, 132

(56) References Cited

U.S. PATENT DOCUMENTS

| | | | |
|---|---|---|---|
| 4,105,298 A | 8/1978 | Levine et al. | |
| 4,838,634 A | 6/1989 | Bennion et al. | |
| 5,046,800 A | 9/1991 | Blyler, Jr. et al. | |
| 5,094,517 A | 3/1992 | Franke | |
| 5,166,993 A | 11/1992 | Blyler, Jr. et al. | |
| 5,764,820 A * | 6/1998 | De Dobbelaere et al. | 385/130 |
| 5,887,116 A * | 3/1999 | Grote | 385/122 |
| 5,917,980 A * | 6/1999 | Yoshimura et al. | 385/129 |
| 6,086,999 A | 7/2000 | Ilvashenko | |
| 6,100,371 A | 8/2000 | Suh et al. | |
| 6,102,905 A | 8/2000 | Baxter et al. | |
| 6,122,416 A * | 9/2000 | Ooba et al. | 385/16 |
| 6,133,472 A | 10/2000 | Nalewajek et al. | |
| 6,226,429 B1 | 5/2001 | Hikita et al. | |
| 6,229,949 B1 | 5/2001 | Ido et al. | |
| 6,245,412 B1 | 6/2001 | Choquette et al. | |
| 6,306,563 B1 * | 10/2001 | Xu et al. | 385/122 |
| 2002/0018633 A1 * | 2/2002 | Imaizumi | 385/132 |
| 2002/0064361 A1 * | 5/2002 | Norwood et al. | 385/130 |
| 2003/0026574 A1 * | 2/2003 | Suzuki et al. | 385/129 |

OTHER PUBLICATIONS

Keil et al., "Athermal All–polymer Arrayed–waveguide Grating Multiplexer", Electronics Letters, Apr. 26, 2001, vol. 37, No. 9.

Keil et al., "Athermal Polarization–independent All–polymer Arrayed Waveguide Grating (AWG) Multi/demultiplexer", Optical Society of America, 200, pp. PD7–1–PD7–3.

* cited by examiner

Primary Examiner—Brian Healy
Assistant Examiner—Daniel Valencia
(74) Attorney, Agent, or Firm—Joseph E. Maehner; Monte & McGraw, PC

(57) ABSTRACT

A waveguide optical amplifier is disclosed. The waveguide optical amplifier includes a generally planar substrate and a lower cladding disposed on the substrate. A first barrier is disposed on the lower cladding and a core is disposed on at least a portion of the first barrier.

15 Claims, 1 Drawing Sheet

PLANAR OPTICAL WAVEGUIDE WITH CORE BARRIER

FIELD OF THE INVENTION

The present invention relates to polymer optical waveguides disposed on polymer substrates, and more specifically, to perfluorinated polymer optical waveguides.

BACKGROUND OF THE INVENTION

Optical waveguides can be formed in polymers by using a core polymer and a cladding polymer with the core polymer refractive index slightly higher than that of the cladding polymer in the near infrared region of the third optical telecommunication wavelength window (around 1550 nm). In order to form useful optical waveguide devices such as integrated splitters, couplers, arrayed waveguide gratings, and optical waveguide amplifiers, it is essential to have stable and low loss optical waveguides. The optical loss, or attenuation of an optical waveguide, originates primarily from two sources: 1) optical absorption and scattering by the core and cladding material themselves and 2) optical signal scattering due to imperfections of the waveguide structure, such as wall roughness.

A general approach for making planar polymer optical waveguides is to dispose an undercladding polymer film layer on a substrate and then a polymer core film layer on top of the undercladding layer. The polymer core layer film subsequently undergoes metallization, lithography and etching processes from which a rectangular cross-section channel is formed. An overcladding polymer film layer is then disposed on top of the waveguide core and the exposed undercladding film layer.

It is well know that, by adding rare earth elements, such as erbium, to a polymer core in an optical waveguide, and by exciting the waveguide with a pump light, the waveguide can act as an optical amplifier, amplifying a light signal being transmitted through the waveguide, allowing the light signal to be transmitted over great distances.

However, it has been found that, when adding the rare earth element, particularly erbium, to the core polymer, adhesion between the core and the cladding layers that surround the core is greatly reduced, whereby the core tends to delaminate from the cladding layers, reducing the effectiveness of the waveguide to transmit light. It would be beneficial to provide a waveguide in which the rare earth containing core properly adheres to the surrounding cladding layers.

BRIEF SUMMARY OF THE INVENTION

Briefly, the present invention provides a waveguide optical amplifier. The waveguide optical amplifier comprises a generally planar substrate and a lower cladding disposed on the substrate. A first barrier is disposed on the lower cladding and a core is disposed on at least a portion of the first barrier.

BRIEF DESCRIPTION OF THE DRAWINGS

The accompanying drawings, which are incorporated herein and constitute part of this specification, illustrate a presently preferred embodiment of the invention, and, together with the general description given above and the detailed description given below, serve to explain the features of the invention. In the drawings.

DETAILED DESCRIPTION OF THE INVENTION

Figure 1:
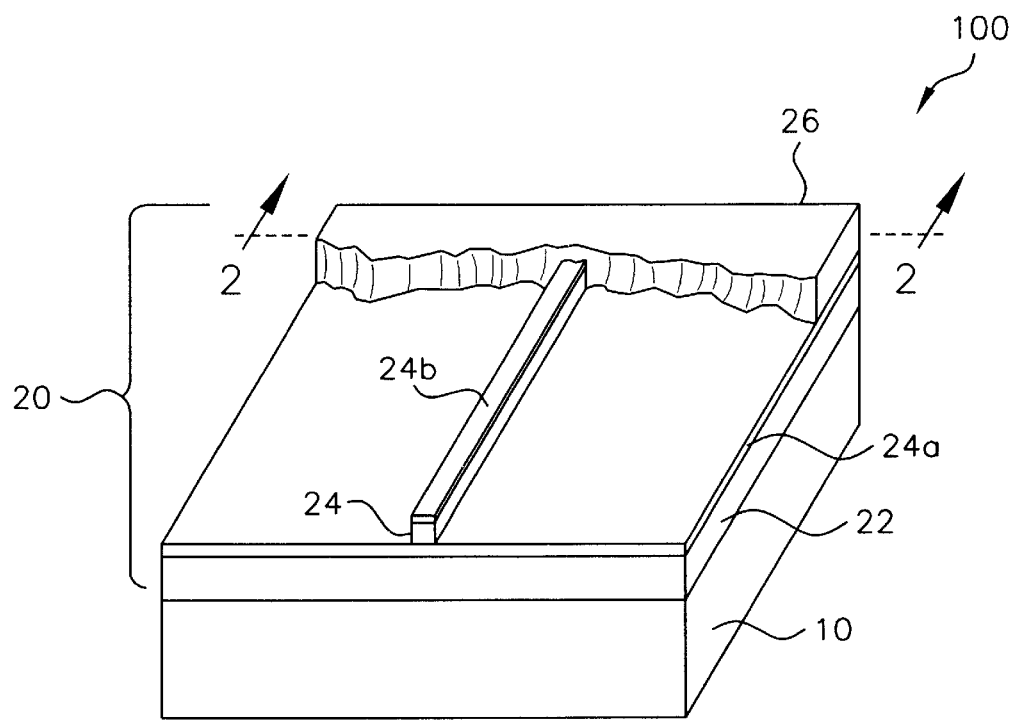
FIG. 1 is a perspective view of a polymer optical amplifier according to the present invention.

In the drawings, like numerals indicate like elements throughout. Co-pending U.S. patent application Ser. No. 10/045,317, filed on even date, which is owned by the assignee of the present invention, is incorporated herein by reference in its entirety. As used herein, the term "element" is defined to mean ions, atoms, isotopes, and species of atoms of the Periodic Table.

Figure 2:
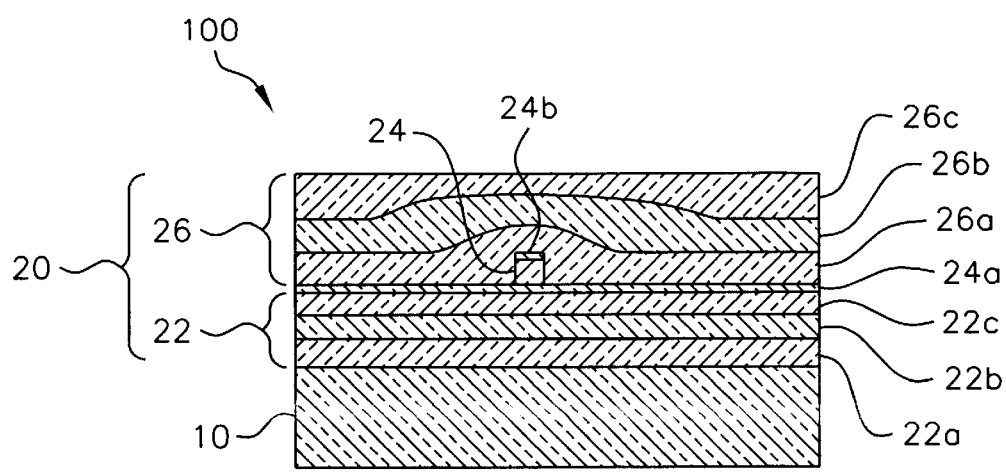
FIG. 2 is a cross-sectional view of the polymer optical amplifier taken along lines 2—2 of FIG. 1.

Referring to FIGS. 1 and 2, an optical waveguide assembly 100 is comprised of a substrate 10 with a polymer optical waveguide 20 disposed on the substrate 10. Preferably, the substrate 10 is a polymer, although those skilled in the art will recognize that the substrate 10 can also be silicon based. The waveguide 20 is comprised of a lower cladding 22, a core 24 disposed on at least a portion of the lower cladding 22, and an upper cladding 26 disposed on the core 24 and a remaining portion of the lower cladding 22. Preferably, the lower cladding 22, the core 24, and the upper cladding 26 are all polymers, and more preferably, all perfluoropolymers.

Preferably, the lower cladding 22 is a polymer, more preferably a halogenated polymer such as a fluoropolymer, and most preferably, a perfluoropolymer including a perfluoropolymer from the group consisting of poly[2,2-bistrifluoromethyl-4,5-difluoro-1,3-dioxole-co-tetrafluoroethylene] (sold under the trademark TEFLON® AF), poly[2,3-(perfluoroalkenyl) perfluorotetrahydrofuran] (sold under the trademark CYTOP®), poly[2,2,4-trifluoro-5-trifluoromethoxy-1,3-dioxole-co-tetrafluoroethylene] (sold under the trademark HYFLON®), although those skilled in the art will recognize that other polymers or polymer blends can be used for the lower cladding 22.

The core 24 is preferably a polymer, more preferably a halogenated polymer such as a perfluoropolymer, and most preferably, for optical amplifier applications, the core 24 is constructed from a perfluoropolymer containing at least one rare earth element from the group consisting of lanthanum, cerium, praseodymium, neodymium, promethium, samarium, europium, gadolinium, terbium, dysprosium, holmium, erbium, thulium, ytterbium, and lutetium. Examples of preferred perfluoropolymers are disclosed in U.S. Pat. No. 6,292,292 and in U.S. patent application Ser. No. 09/722,821, filed Nov. 28, 2000; Ser. No. 09/722,282, filed Nov. 28, 2000, and Ser. No. 60/314,902, filed Aug. 24, 2001, which are all owned by the assignee of the present invention and are all incorporated herein by reference in their entireties. However, those skilled in the art will recognize that other polymers containing a rare earth element can also be used. Further, the core 24 can be a blend of polymers including at least a first polymer containing at least one of the rare earth elements disclosed above and at least a second polymer.

In order for the core 24 to properly adhere to the lower cladding 22, a first barrier 24a is disposed on the lower cladding 22. Preferably, the first barrier 24a is between approximately 0.25 microns and 0.5 microns thick. Also preferably, for a core 24 that includes at least the first polymer containing one of the rare earth elements disclosed above and at least the second polymer, the first barrier 24a is only the second polymer. For a core 24a that includes only a polymer containing at least one rare earth element, the first barrier 24a is preferably that polymer, but without the at least one rare earth element.

A second barrier 24b is disposed on top of the core 24. The second barrier 24 enables a metal, such as aluminum, to be deposited on top of the core 24 for waveguide etching, and also enables the upper cladding 26 to adhere to the top of the core 24 after the core 24 is etched. Preferably, the second barrier 24b is the same material as the first barrier 24a and is approximately the same thickness as the first barrier 24a, as described above.

The upper cladding 26 is a polymer, and, preferably a perfluoropolymer. More preferably, the upper cladding 26 is the same polymer or polymer blend as the lower cladding 22. However, those skilled in the art will recognize that the upper cladding 26 and the lower cladding 22 need not necessarily be the same polymer, although it is preferred that the upper cladding 26 have the same, or nearly the same, refractive index $n_{cl}$ as the lower cladding 22.

Preferably, the lower cladding 22 and the upper cladding 26 have a common refractive index $n_{cl}$ and the core 24 has a refractive index $n_{co}$ that differs from the refractive index $n_{cl}$ by a small enough amount such that the waveguide assembly 100 propagates a signal light $\lambda_s$ in a single mode. For the case where the cladding layers 22, 26 are homogeneous, with a single refractive index $n_{cl}$, the relationship between dimensions of the core 24 and $\Delta n$ ($n_{co}-n_{cl}$) is well-captured by the dimensionless V parameter, defined by:

$$V = \frac{2\pi}{\lambda} a \sqrt{\Delta n} \quad \text{Equation (1)}$$

where $\lambda$ is the wavelength, preferably in nanometers, of light to be transmitted through the core 24 and $\alpha$ is the width and height of the core 24, also preferably in nanometers. The V parameter must be less than 2.5 in order to achieve the single-mode condition. When $\Delta n$ is large, $\alpha$ must be kept small to achieve V<2.5. Such a requirement may result in low optical efficiency coupling to an optical fiber, resulting in undesired signal loss. For a V of 2.5, with $\Delta n$ of approximately 0.04, at a wavelength $\lambda$ of 1550 nanometers, $\alpha$ is approximately 3000 nanometers, or 3 microns.

Preferably, the waveguide assembly 100 is adapted to amplify light for use in an optical amplifier, although those skilled in the art will recognize that the waveguide assembly 100 can be an optical splitter, an optical combiner, or other optical components that can be constructed from a waveguide. For such non-amplification uses, the core 24 need not contain the rare earth element as described above.

To manufacture the waveguide assembly 100, the substrate 10 is first prepared. For a polymer substrate, the surface of the substrate 10 is cleaned to remove any residue which may be present on the surface of the substrate 10. Typically, a substrate provides a relatively smooth surface on which it can be difficult to deposit a perfluoropolymer, owing to the non-adhesive characteristics of perfluoropolymers in general. After cleaning, the substrate 10 is prepared to provide better adhesion of the lower cladding 22 to the surface of the substrate 10. The substrate 10 can be prepared by roughening the surface or by changing the chemical properties of the surface to better retain the perfluoropolymer comprising the lower cladding layer 22. The preferred roughening method is to perform reactive ion etching (RIE) using argon. The argon physically deforms the surface of the substrate 10, generating a desired roughness of approximately 50 to 100 nanometers in depth. The preferred method that changes the chemical properties of the surface of the substrate 10 is to perform RIE using oxygen the oxygen combines with the polymer comprising the surface of the substrate 10, causing a chemical reaction on the surface of the substrate 10 and oxygenating the surface of the substrate 10. The oxygenation of the substrate 10 allows the molecules of the perfluoropolymer comprising the lower cladding 22 to bond with the substrate 10. Although RIE with argon and oxygen is disclosed, those skilled in the art will recognize that other methods can be used to prepare the substrate 10. For a substrate constructed from a material other than a polymer, such a silicon, well known methods of preparing the substrate can be used.

The lower cladding 22 is then deposited onto the substrate 10. For a lower cladding 22 constructed from HYFLON®, solid HYFLON® is dissolved in a solvent, perfluoro (2-butyltetrahydrofuran), which is sold under the trademark FC-75, as well as perfluoroalkylamine, which is sold under the trademark FC-40. Other potential solvents are a perfluorinated polyether, such as that sold under the trademark H GALDEN® series HT170 or H GALDEN® series HT135, or a hydrofluoropolyetlher, such as that sold under the trademarks H GALDEN® series ZT180 and ZT130. For a lower cladding 22 constructed from other polymers, each polymer is dissolved in a suitable solvent to form a polymer solution. The polymer solution is then spin-coated onto the substrate 10 using known spin-coating techniques. The substrate 10 and the lower cladding 22 are then heated to evaporate the solvent from the solution.

Preferably, the lower cladding 22 is spincoated in layers, such that a first layer 22a is applied to the substrate 10 and annealed to evaporate the solvent, a second layer 22b is applied to the first layer 22a and annealed, and a third layer 22c is applied to the second layer 22b and annealed. Preferably, after all of the layers 22a, 22b, 22c are applied, the lower cladding 22 has achieved a height of between 8 and 20 micrometers. Although the application of three layers 22a, 22b, 22c are described, those skilled in the art will recognize that more or less than three layers 22a, 22b, 22c can be used. For example, a single, relatively thick, layer of the lower cladding 22 can be used.

After the lower cladding 22 has dried, the first barrier 24a is deposited onto the lower cladding 22, preferably using the same technique as described above to deposit the lower cladding 22 onto the substrate 10. Preferably, only one layer of the first barrier 24a is deposited onto the lower cladding 22. Also preferably, the first barrier 24a is soluble in a solvent in which the lower cladding 22 is not soluble or much less soluble so that the solvent does not penetrate the lower cladding 22 and disturb the lower cladding 22. For a first barrier constructed from CYTOP®, solid CYTOP® is dissolved in a solvent, such as perfluorotrialkylamine, which is sold under the trademark CT-SOLV 180™, or any other solvent that readily dissolves CYTOP®, forming a CYTOP® solution. Alternatively, CYTOP® can be commercially obtained already in solution.

After the first barrier 24a has dried, the core 24 is deposited onto the first barrier 24a, preferably using the same technique as described above to deposit the lower cladding 22 onto the substrate 10. Preferably, only one layer of the core 24 is deposited onto the lower cladding 22. For a waveguide assembly 100 that will be used as an optical amplifier, the rare earth containing perfluoropolymer is then blended with a CYTOP® solution and the combined rare earth containing perfluoropolymer/ CYTOP® solution is applied over the first barrier 24a. After the core 24 is dried, a preferred thickness of the core 24, the first barrier 24a and lower cladding 22 is approximately between 12 and 22 microns.

After the core 24 has dried, the second barrier 24b is deposited onto the core 24, preferably using the same technique as described above to deposit the lower cladding 22 onto the substrate 10. Preferably, only one layer of the second barrier 24b is deposited onto the core 24.

A metal layer (not shown), such as aluminum, is then deposited onto the second barrier 24b. The second barrier 24b allows the metal layer to adhere to the waveguide assembly 100. Next, the core 24, along with the first and second barriers 24a, 24b, is patterned and etched to provide a desired core shape. The metal layer is used to mask the core 24 during the etching. Preferably, the etching is performed by RIE, which is well known in the art. However, those skilled in the art will also recognize that other methods of etching the core 24 may also be used. After etching, the metal layer is removed from the second barrier 24b.

While FIG. 1 discloses a generally straight core 24, those skilled in the art will recognize that other shapes can be used, such as the curved waveguide shape disclosed in U.S. patent application Ser. No. 09/877,871, filed Jun. 8, 2001, which is owned by the assignee of the present invention and which is incorporated herein by reference in its entirety. Further, while FIG. 2 discloses a generally rectangular cross section for the core 24, those skilled in the art will recognize that the cross section of the core 24 can be other shapes as well. Preferably, the core 24 is etched down to the first barrier 24a, although a thin layer of the core 24 over the first barrier 24a may be retained without severely degrading the performance of the waveguide assembly 100. The first barrier 24a may be retained for manufacturing purposes as will be described later herein. Alternatively, the barrier 24a can be completely etched away down to the lower cladding 22.

Next, the upper cladding 26 is deposited onto the second barrier 24b, the first barrier 24a, and any remaining portion of the lower cladding 22 not covered by the first barrier 24a. Preferably, similar to the lower cladding 22, the upper cladding 26 is spincoated in layers, such that a first layer 26a is applied to the second barrier 24b, the first barrier 24a, and any remaining portion of the lower cladding 22 not covered by the first barrier 24a and annealed to evaporate the solvent. For multiple layers, such as three layers, a second layer 26b is applied to the first layer 26a and annealed, and a third layer 26c is applied to the second layer 26b and annealed. Preferably, the upper cladding 26 is soluble in a solvent in which the first barrier 24a, the core 24, and the second barrier 24b are not soluble so that the solvent does not penetrate the first barrier 24a and the second barrier 24b and disturb the first barrier 24a or the second barrier 24b. The first barrier 24a can be used to provide a barrier between the upper cladding 26 and the lower cladding 22, so that, since the upper cladding 26 and the lower cladding 22 are preferably the same material, the solvent in which the upper cladding 26 is applied does not penetrate to the lower cladding 22. Preferably, after all of the layers 26a, 26b, 26c are applied, the entire waveguide assembly 100 has achieved a height of between 15 and up to approximately 50 micrometers. Although the application of three layers 26a, 26b, 26c are described, those skilled in the art will recognize that more or less than three layers 26a, 26b, 26c can be used.

As can be seen in FIG. 2, the layers 26a, 26b, 26c are not necessarily flat, but contour around the core 24 and the second barrier 24b with decreasing curvature for each successive layer 26b, 26c. Although the last layer 26c is shown with a generally flat top surface, those skilled in the art will recognize that the top surface of the last layer 26c need not necessarily be flat.

After forming the waveguide assembly 100, the waveguide assembly 100 is cut to a desired size and shape, preferably by dicing. As shown in FIG. 1, a desired shape is generally rectangular, although those skilled in the art will recognize that the waveguide assembly 100 can be cut to other shapes as well.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A waveguide optical amplifier comprising:

a generally planar substrate;

a fluoropolymer lower cladding disposed on the substrate;

a first barrier disposed on the lower cladding; and a core disposed on at least a portion of the first barrier.

2. The waveguide optical amplifier according to claim 1, further comprising a second barrier disposed on the core.

3. The waveguide optical amplifier according to claim 2, further comprising an upper cladding disposed on the second barrier and a remaining portion of the first barrier.

4. The waveguide optical amplifier according to claim 3, wherein the upper cladding is a polymer.

5. The waveguide optical amplifier according to claim 4, wherein the polymer is a fluoropolymer.

6. The waveguide optical amplifier according to claim 5, wherein the fluoropolymer is a perfluoropolymer.

7. The waveguide optical amplifier according to claim 1, wherein the substrate is a polymer.

8. The waveguide optical amplifier according to claim 1, wherein the substrate is silicon.

9. The waveguide optical amplifier according to claim 1, wherein the fluoropolymer is a perfluoropolymer.

10. The waveguide optical amplifier according to claim 1, wherein the core is a polymer.

11. The waveguide optical amplifier according to claim 10, wherein the polymer is a fluoropolymer.

12. The waveguide optical amplifier according to claim 11, wherein the fluoropolymer is a perfluoropolymer.

13. The waveguide optical amplifier according to claim 11, wherein the fluoropolymer comprises a first fluoropolymer and a second fluoropolymer.

14. The waveguide optical amplifier according to claim 13, wherein one of the first and second fluoropolymers is doped with a rare earth element.

15. The waveguide optical amplifier according to claim 14, wherein the barrier is comprised of the other of the first and second fluoropolymers.

* * * * *